(12) United States Patent
Stoll et al.

(10) Patent No.: US 7,618,070 B2
(45) Date of Patent: Nov. 17, 2009

(54) FLUID COUPLING ASSEMBLY

(75) Inventors: Robert H. Stoll, Alden, NY (US);
Gregory L. Adams, Clarkston, MI (US);
James C. Caroll, Novi, MI (US); James D. Messecar, Sr., Wyoming, NY (US)

(73) Assignee: Jiffy-Tite Co, Inc., Lancaster, NY (US)

( * ) Notice: Subject to any disclaimer, the term of this patent is extended or adjusted under 35 U.S.C. 154(b) by 228 days.

(21) Appl. No.: 11/479,043

(22) Filed: Jun. 30, 2006

(65) Prior Publication Data

US 2008/0001398 A1  Jan. 3, 2008

(51) Int. Cl.
*F16L 37/00* (2006.01)

(52) U.S. Cl. ............ 285/305; 285/288.1; 285/379

(58) Field of Classification Search .......... 285/93, 285/319, 288.1, 21.1, 379, 305, 321
See application file for complete search history.

(56) References Cited

U.S. PATENT DOCUMENTS

| | | | | |
|---|---|---|---|---|
| 5,462,313 A | * | 10/1995 | Rea et al. | 285/21.1 |
| 5,568,946 A | * | 10/1996 | Jackowski | 285/38 |
| 5,573,279 A | * | 11/1996 | Rea et al. | 285/21.1 |
| 6,199,916 B1 | * | 3/2001 | Klinger et al. | 285/288.1 |
| 6,733,047 B1 | * | 5/2004 | Stieler | 285/319 |
| 6,832,785 B1 | * | 12/2004 | Zitkovic, Jr. | 285/21.1 |
| 7,377,553 B2 | * | 5/2008 | Takayanagi | 285/87 |
| 2003/0127855 A1 | * | 7/2003 | Heverly | 285/227 |

* cited by examiner

*Primary Examiner*—David E Bochna
(74) *Attorney, Agent, or Firm*—John C. Thompson

(57) ABSTRACT

A fluid coupling assembly which has a novel female subassembly capable of receiving a male portion, the female subassembly being formed by spin welding two generally cylindrical plastic parts together, one of the parts being a quick connect end portion and the other part being the barb end portion. The female subassembly is provided with a key or keyway to prevent rotation, to mate with a corresponding key or keyway on the male portion to prevent false connections, and to act as a clear visual aid for orientation. In this design differing barb end portions can be secured to a common quick connect end portion.

2 Claims, 4 Drawing Sheets

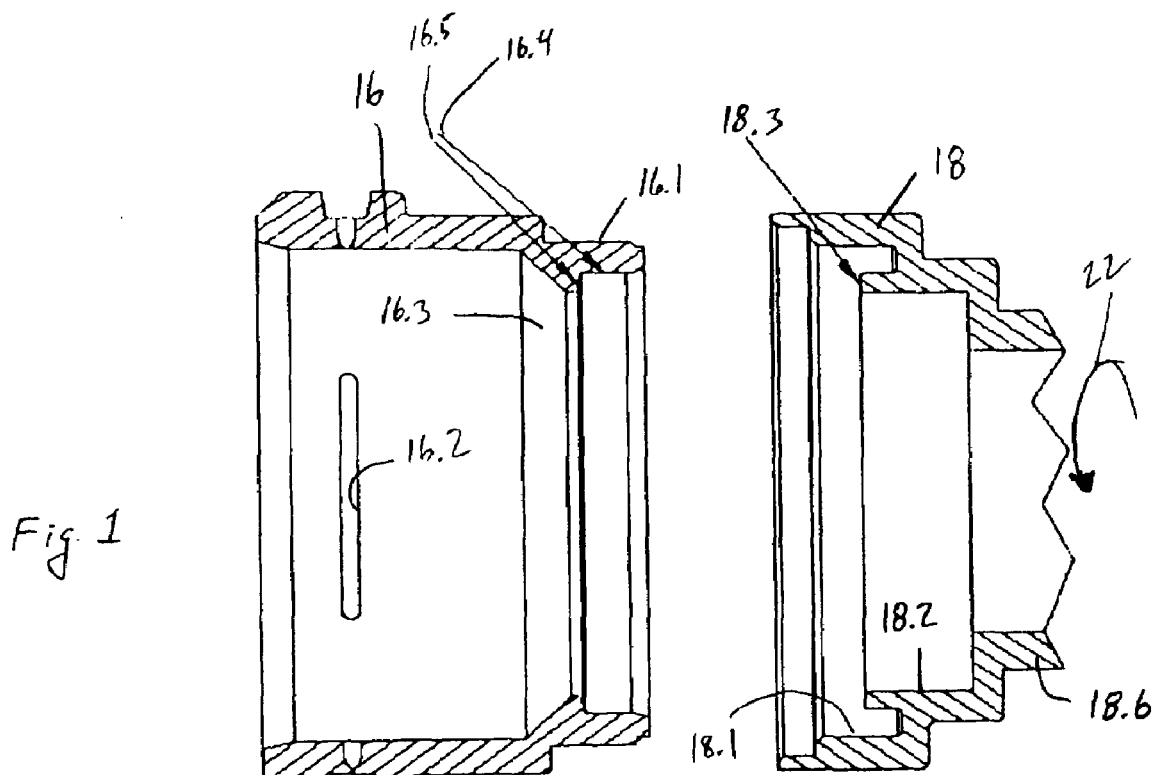
Fig. 1
Fig. 2
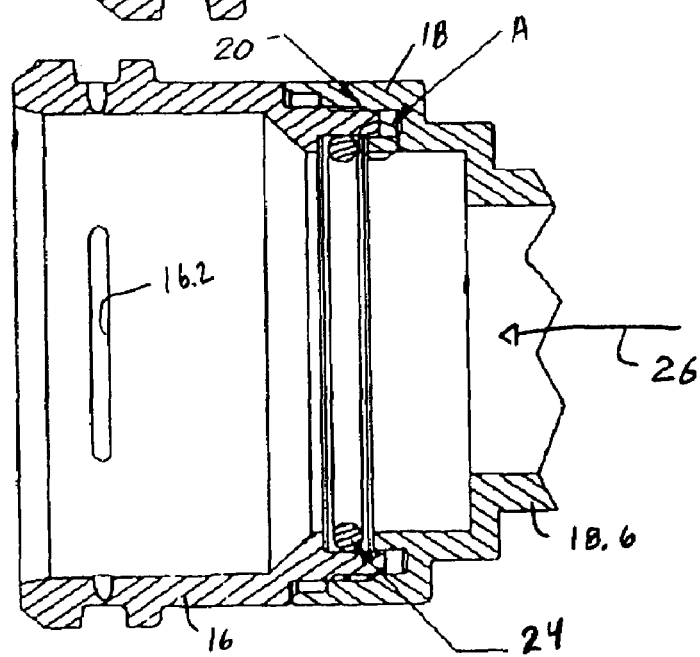
Fig. 3

FLUID COUPLING ASSEMBLY

TECHNICAL FIELD

The present invention relates to a fluid coupling assembly, and more particularly to a female subassembly which is capable of receiving a male portion, the female subassembly being formed by spin welding two generally cylindrical plastic parts together, one of the parts being a quick connect end portion which is provided with a key or keyway to prevent rotation, to prevent false connections, and to act a clear visual aid for orientation, and the other part being the barb end portion.

BACKGROUND OF THE INVENTION

Fluid coupling assemblies are well known in the art. One form of fluid coupling assembly is shown in U.S. Pat. No. 4,640,534. This design has become popular in the automotive industry. This design was originally made of machined metal parts. However, the auto industry is looking for parts that both cost less and weigh less. It is also known to use spin welding techniques when forming a fluid coupling such as that shown in U.S. Pat. No. 6,832,785.

OBJECTS AND SUMMARY OF THE INVENTION

It is an object of the present invention to provide a fluid coupling assembly which is less expensive than prior art fluid coupling assemblies.

It is a further object of the present invention to provide a fluid coupling assembly which will weigh less than prior art fluid coupling assemblies.

It is an additional object of the present invention to provide a fluid coupling assembly which can be readily made from plastic molded parts and which can be assembled together by spin welding.

These and other objects and advantages of the present invention will become apparent from a consideration of the following detailed description taken in conjunction with the accompanying drawings.

BRIEF DESCRIPTION OF THE FIGURES

FIG. 1 is a sectional view through the quick connect end portion of the female subassembly of a first design of a fluid coupling assembly of this invention.

FIG. 2 is a sectional view through the barb end portion of the female subassembly of a first design of a fluid coupling assembly of this invention, the barb being shown broken off.

FIG. 3 is a sectional view of the quick connect portion and the barb end portion of the first design shown in FIGS. 1 and 2 after the parts have been spun welded together.

DETAILED DESCRIPTION

Figure 10:
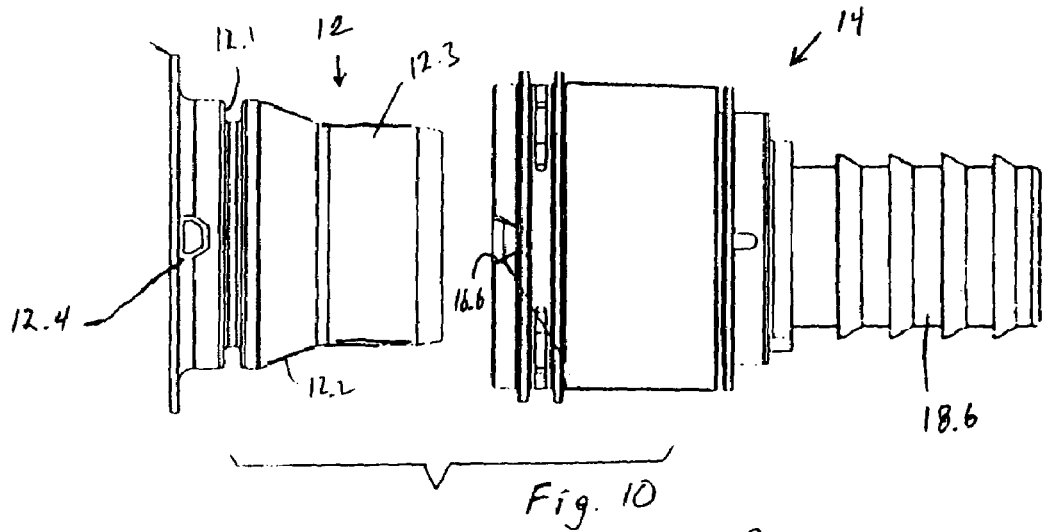
FIG. 10 is a side elevation view of a male portion of the fluid coupling assembly of this invention before it has been mated with the female assembly.
Figure 11:
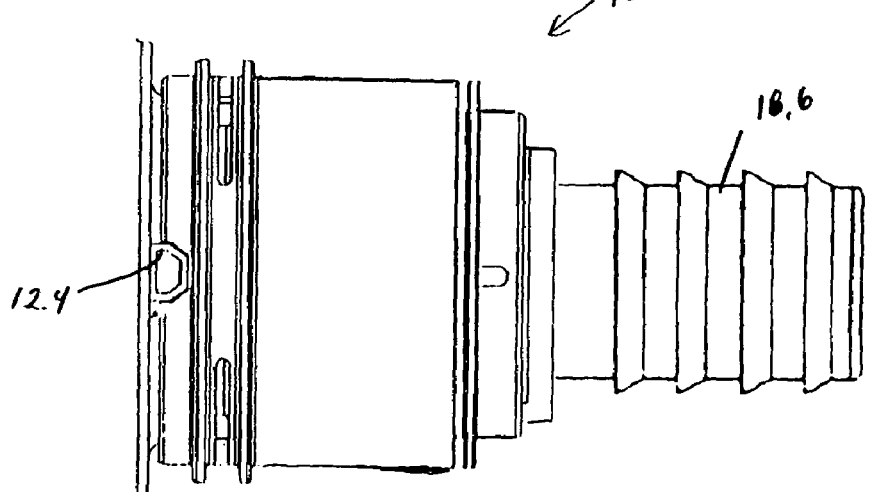
FIG. 11 is a side elevational view of the fluid coupling assembly after all parts have been assembled together.

The fluid coupling assembly of this invention, which is indicated generally at 10, is best shown in FIGS. 10 and 11. The assembly includes as its principal components a male coupler indicated generally at 12, and a two part female coupling subassembly capable of receiving the male coupler, the female subassembly being indicated generally at 14. The female subassembly is formed of two principal components, a quick connect end portion and a barb end portion.

Figure 13:
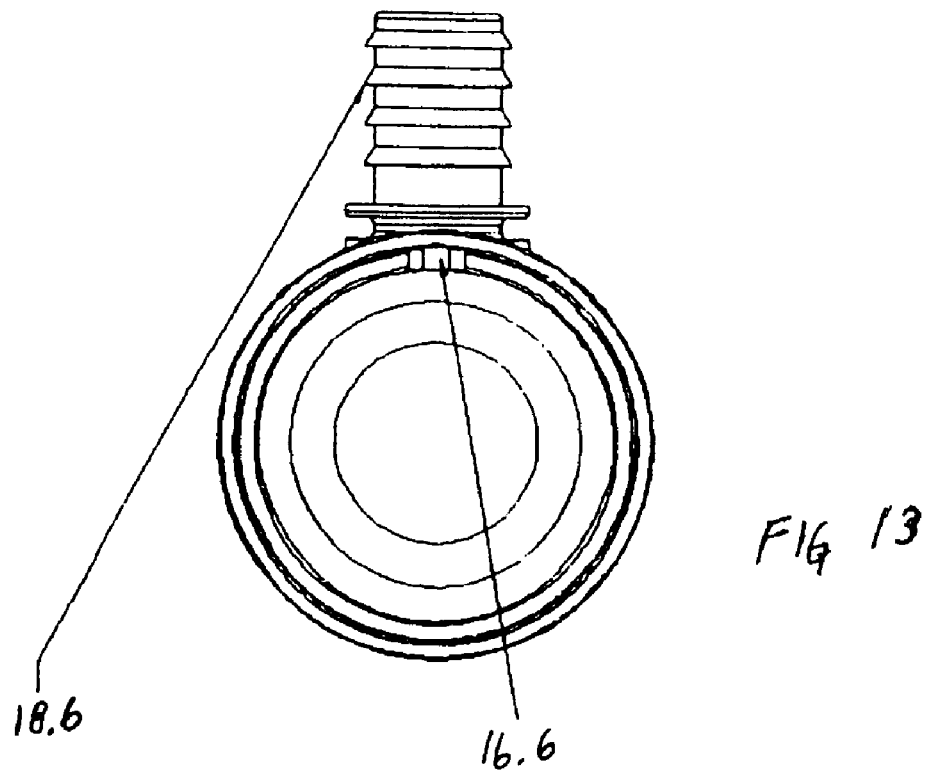
FIGS. 12 and 13 show the fluid coupling assembly of this invention with 90° barbs at differing orientations with respect to the key and/or keyway.
Figure 12:
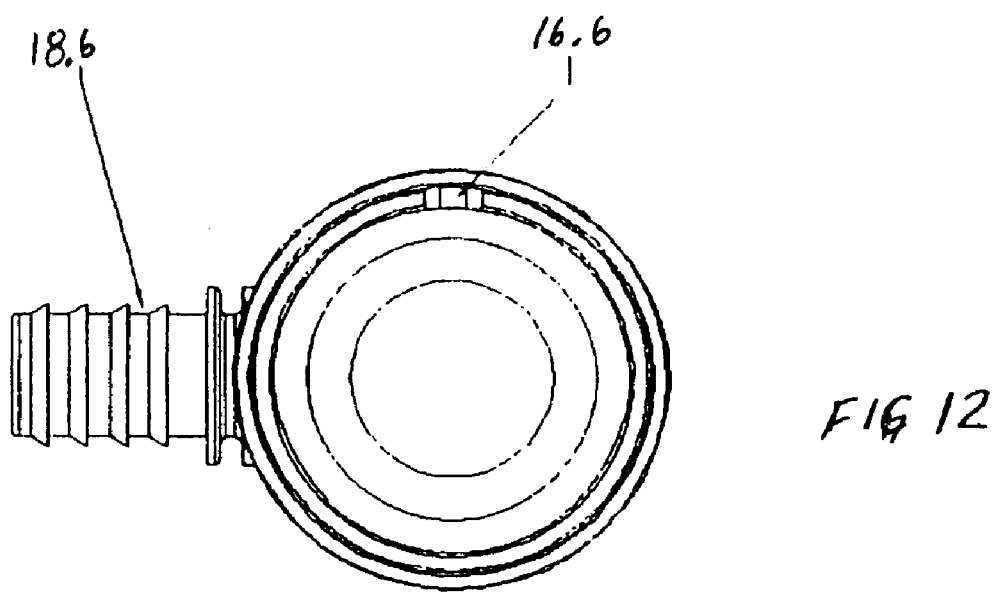

In FIGS. 1-3 a first design of a fluid coupling assembly of this invention is illustrated. In this design the quick connect end portion is indicated 16 and the barb end portion is shown at 18. These two parts are made of plastic materials which can be spun welded together, the weld being indicated at 20. To this end, the quick connect end portion is provided with a reduced diameter end cylindrical portion 16.1, and the barb end portion is provided with a mating cylindrical portion 18.1. To weld the parts together one part is held stationary, for example the quick connect end portion 16, while the other portion, for example the barb end portion 18, is rotated and moved into the other portion as indicated by arrow 22. Because the parts are designed to have a friction fit, sufficient heat will be developed during the rotation to melt adjacent parts. The mechanism which rotates and advanced the parts together has a suitable stop mechanism so that the parts will be in their desired relationship when the rotation is stopped. After rotation has stopped, the parts will cool down and the melted material will form a weld between the parts. It is particular advantage of this invention that a common quick connect portion may be used with differing barb ends, for example with a barb end having the barb shown in FIG. 9, one with the barb end as shown in FIGS. 10 and 11, or a barb end having a right angle barb as shown in FIGS. 12 and 13. Also, it is possible to orient the barb end to the male portion by use of interfitting parts such as keys and keyways as will be discussed below.

While the male portion is not indicated in FIGS. 1-3, it will be of the same general construction shown in FIG. 10, having a groove 12.1, a frusto-conical portion 12.2 and a reduced diameter cylindrical portion 12.3. When the male portion is being inserted into the female subassembly a spring clip, not shown, which is received in the clip slots 16.2 will initially slide over the frusto conical portion 12.2 during insertion. The spring clip may be of the design shown at 18 in U.S. Pat. No. 4,640,534. When the male member 12 is fully inserted, the spring clip will have a portion engaging the groove 12.1 to retain the male member 12 within the female portion, and the frusto-conical portion 12.2 of the male member will be bearing against a frusto-conical surface 16.3 of the portion 16. At this time, the reduced diameter cylindrical portion 12.3 will be snugly received within a reduced diameter cylindrical portion 18.2 of the barb end portion 18. In addition, the portion 12.3 will bear against an O-ring 24 to form a fluid tight seal. In the design shown in FIGS. 1-3 the O-ring 24 is received in an O-ring gland. The gland is formed by an internal cylindrical surface 16.4 and a shoulder 16.5 of the quick connect end portion 16, and also by an annular surface 18.3 of the barb end portion 18 when the barb end portion 18 and the quick connect portion are in their assembled position as shown in FIG. 3. As high pressure fluids typically enter the fluid coupling assembly 10 of this invention from the barb end side as indicated by the arrow 26, there is a potential leak path through the weld 20 if the weld is not 100% continuous, a portion of the potential leak path being highlighted by the circle A.

A preferred design is shown in FIGS. 4-11 where common parts have the same reference numerals. Thus, the quick connect end portion is indicated at 16, the spring clip receiving slots at 16.2, the frusto-conical surface at 16.3, and the shoulder at 16.5. Also, the barb end portion is indicated at 18, the reduced diameter cylindrical portion at 18.2, and the annular surface at 18.3. The weld is shown at 20, and the O-ring is also indicated at 24. This design differs from that shown in FIGS. 1-3 in that the leak path to the weld 20 is from the low pressure quick connect portion 16 rather than from the high pressure barb portion 18, a portion of the potential leak path being highlighted by the circle B. In the design of FIGS. 4-11, the weld is formed by rotating an exterior cylindrical surface 18.4 (FIG. 5) against an interior cylindrical surface 16.6 (FIG. 4) until the weld 20 has been formed by spin welding. The O-ring gland is formed by the shoulder 16.5, the annular surface 18.3 and by an internal cylindrical surface 18.5. Thus by having the internal cylindrical surface of the O-ring gland integral with the shoulder 18.3 the leak path identified at A in FIG. 3 has been eliminated.

Figures 4, 5:
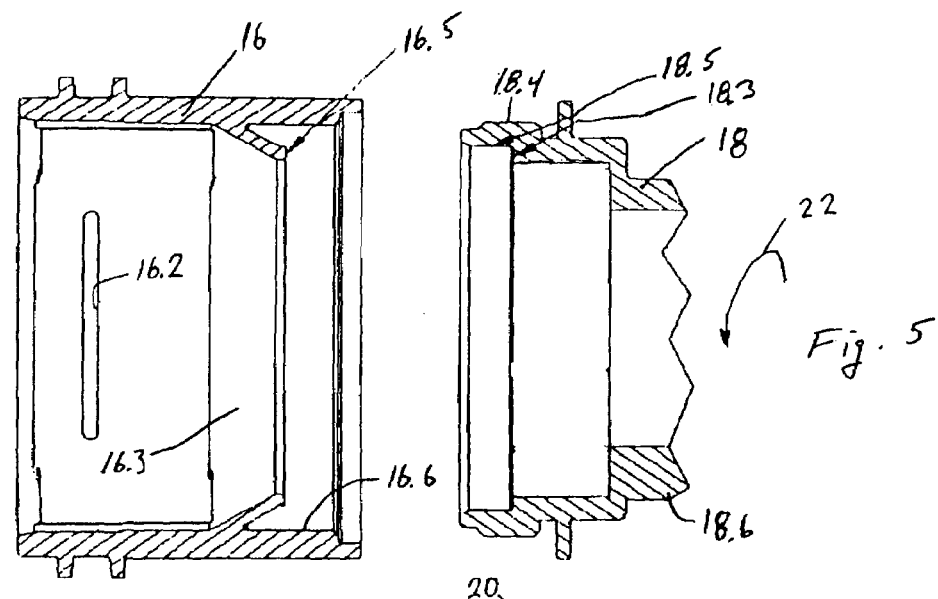
FIG. 4 is a sectional view through the quick connect end portion of the female subassembly of a preferred design of a fluid coupling assembly of this invention.
FIG. 5 is a sectional view through the barb end portion of the female subassembly of a preferred design of a fluid coupling assembly of this invention, the barb being shown broken off.
Figure 6:
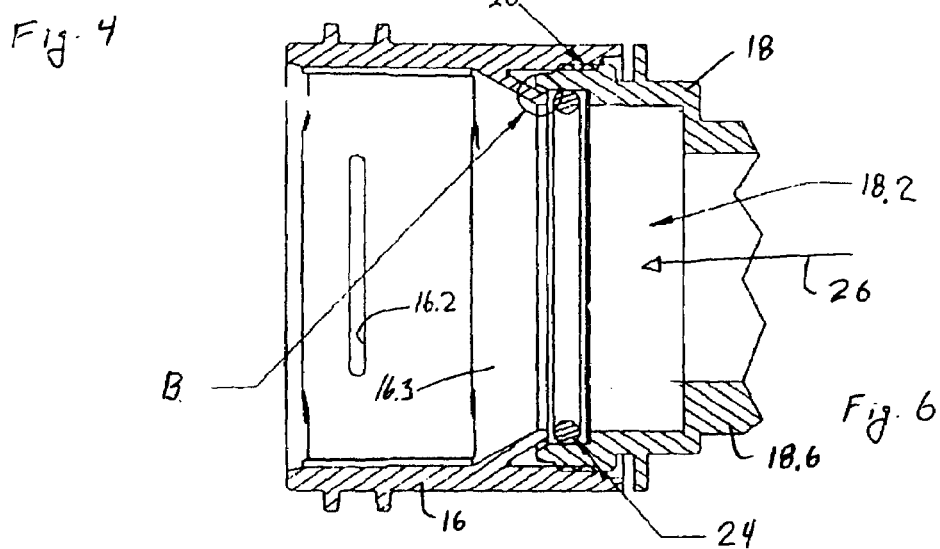
FIG. 6 is a sectional view of the quick connect portion and the barb end portion of the preferred design of the fluid coupling assembly of this invention after the parts have been spun welded together.
Figure 7:
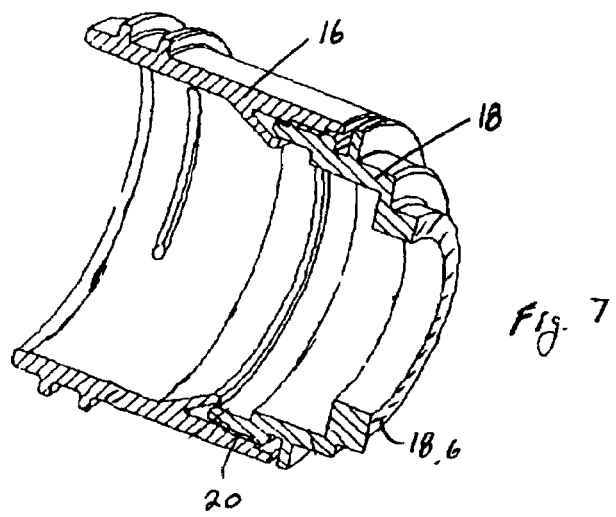
FIG. 7 is a perspective sectional view of the parts shown in FIG. 6, the O-ring shown in FIG. 6 not being shown in FIG. 7.
Figure 8:
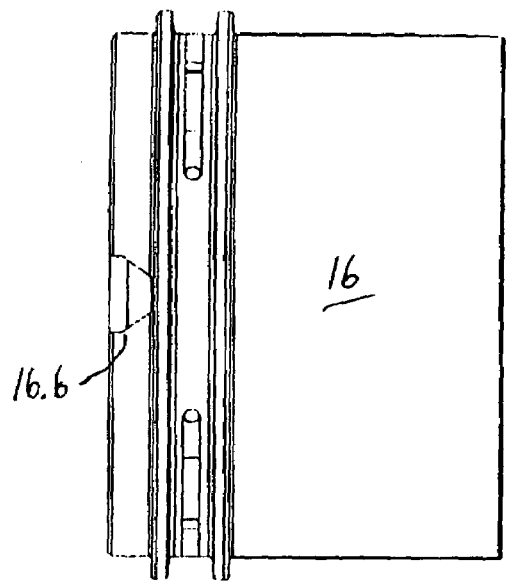
FIGS. 8 and 9 are side elevational view of the female subassembly parts before they have been spun welded together, the barb portion shown in FIG. 9 having a large diameter single barb.
Figure 9:
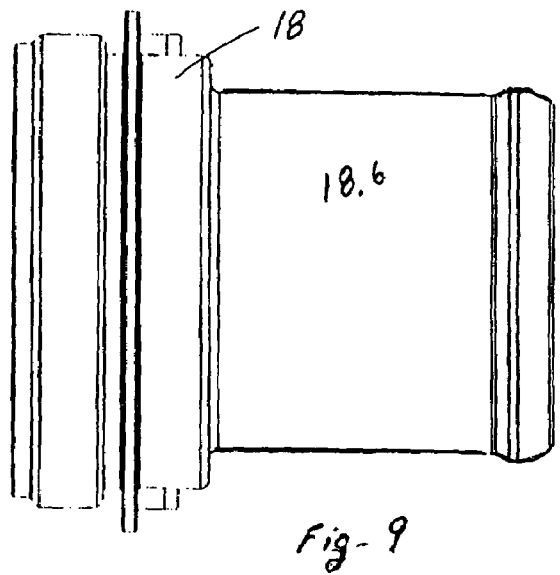

While the barb end portion 18.6 has been broken off in FIGS. 1-7, it is shown in FIGS. 9-13. To this end, it can be seen that the barb 18.6 may have differing configurations. Thus, as shown in FIG. 9, it has a single ferrule, while in FIGS. 10-13 it has four barbs. Also, as shown in these FIGURES it may have differing orientations.

It is a feature of this invention that the female subassembly 14 and the male coupler are provided with mating interfitting parts to insure that the parts are in proper alignment with each other. To this end the male portion as illustrated is provided with a key 12.4 which may mate with a suitable keyway 16.6. While a key has been shown on the male portion 12, and a keyway on the female portion 16, it should be obvious that other forms of interfitting parts may be utilized. The reason the parts are provided with interfitting parts are to insure that the parts are in the proper orientation with respect to each other. Thus, it may be desirable to have the right angle barb, as shown in FIG. 12 90° offset from the keyway, whereas in FIG. 13 it may be aligned with the keyway.

While forms of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A fluid coupling assembly, comprising:
   a female subassembly capable of receiving a male portion, the female subassembly including two parts made of a plastic, one of the parts being a quick connect end portion, and the other part being a barb end portion, the barb end portion having an extension with an inner cylindrical surface and a shoulder surface adjacent the inner surface forming two surfaces of an O-ring gland, the quick connect end portion is provided with a shoulder portion which forms a third surface of the O-ring gland;
   an O-ring received in the O-ring gland; and
   a substantially continuous cylindrical weld extending between the quick connect end portion and the barb end portion for securing the parts together, by the substantially continuous weld being formed between an outer surface of the barb end portion and an interior cylindrical surface of the quick connect portion.

2. The fluid coupling assembly as set forth in claim 1 further comprising an O-ring, the substantially continuous cylindrical weld being on the quick connect portion side of the O-ring.

* * * * *